INVENTORS
GERBEN VONK
HERMEN ZWAGERMAN
BY
AGENT

3,384,157
REGENERATOR
Gerben Vonk and Hermen Zwagerman, Emmasingel, Eindhoven, Netherlands, assignors to North American Philips Company, Inc., New York, N.Y., a corporation of Delaware
Filed Aug. 26, 1965, Ser. No. 482,872
Claims priority, application Netherlands, Sept. 11, 1964, 64—10,575
2 Claims. (Cl. 165—10)

ABSTRACT OF THE DISCLOSURE

A regenerator filling mass particularly suitable for operation in extremely low temperature regions. The regenerator mass takes the form of band of poor thermal conductivity covered with preferably flattened lead pellets which are adhered to an adhesive backing on the band. The present arrangement results in a large surface area for heat exchanging contact between the gas and the regenerative material.

---

This invention relates to regenerators of the type comprising a housing which contains at least one band-shaped filling mass in the rolled-up state. Known regenerators of the kind to which the present invention relates involve the problem of the thermal conductivity through the material of the band in the direction of flow through the regenerator. Especially for obtaining extreme temperatures it is important that the space factor is high and that as large as possible a heat-transmitting surface is present. This gives rise to band material of very small thickness and hence low tensile strength, so that the band is no longer strong enough.

An object of the invention is to provide a solution to these problems. The invention is characterized in that the filling mass comprises a rolled-up band of a material having a poor heat-conductivity, which band is covered on one side or on each side with a layer of a material having a comparatively high specific heat.

The filling mass according to the invention has a low heat-conductivity in the direction of flow. While the carrier material provides for the required rigidity, the material applied thereto may be soft and brittle.

In one advantageous embodiment of the regenerator according to the invention the band of material having a poor heat-conductivity may be foil of synthetic material or paper. Under certain conditions it is also possible to use a metallic band, which then has a thermal conductivity which is considerably lower than that of the applied layer of material.

In another advantageous embodiment the layer of material having a comparatively high specific heat is formed by particles of a material having a high specific heat, which particles are adhered to the band and then flattened so as to contact one another at least substantially. A layer is thus obtained which has a thermal capacity equal to that of a homogeneous layer of the same thickness, but whose contact surfaces between the particles serve as heat transmission resistances. Consequently the layer will have a poor thermal conductivity.

To prevent adjacent turns from contacting one another with all unpleasant consequences thereof, the layer of material having a comparatively high specific heat has unevennesses which serve as spacers between sequential turns.

In another advantageous embodiment of the regenerator according to the invention the applied layer is of a material having a comparatively high specific heat at a very low temperature. According to the invention the said material may be chosen from the group lead, mercury, cadmium, or compounds thereof. All these materials still have a comparatively high specific heat even at very low temperatures. However, they are all comparatively soft and therefore cannot readily be worked into a band-shaped filling mass because of their low strength. The present invention affords the solution to this problem. The carrier band imparts the required rigidity to the rolled-up filler band.

To reduce still further the heat-conductivity of the filling mass according to the invention in the direction of flow, the rolled-up band has perforations. These perforations have the advantage to allow an exchange of the medium in the transverse direction and, in addition, to decrease the thermal conductivity in the direction of flow.

The invention also relates to a method of manufacturing the present regenerator. This method is characterized in that a thin band of a material having a comparatively poor conductivity is provided, at least on one side, with an adhesive layer to which particles of a material having a high specific heat are adhered, the resulting band subsequently being rolled so that the particles are flattened and urged against one another at least substantially, whereafter the band is rolled up and arranged in the housing of the regenerator.

According to the invention the particles may be caused to adhere to the band by pulling the band, after being provided with an adhesive layer, through a space filled with particles of a material having a high specific heat.

According to the invention, the band is provided, after or during rolling, with unevennesses which serve as spacers between sequential turns. Unevennesses may be formed by leading the band through a profile roller so as to obtain ribs transversely of the direction of length of the band.

The band is provided with perforations prior to being rolled up. From a viewpoint of saving material it is advantageous to perforate the band before the adhesive layer is provided.

In order that the invention may be readily carried into effect, it will now be described in detail, by way of example, with reference to the accompanying diagrammatic drawing in which FIGURES 1 and 2 are an elevational view and a cross-sectional view respectively of a portion of a band which may be rolled up to form a filling mass for a regenerator;

Figure 1:
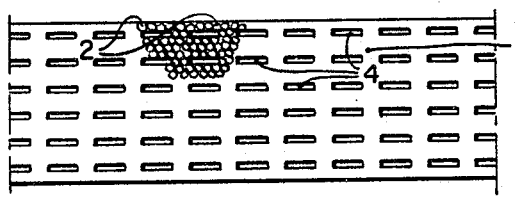
Figure 2:
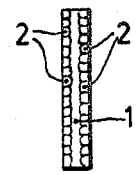

Referring now to FIGURES 1 and 2, reference numeral 1 indicates a band having a poor thermal conductivity, for example, a paper foil having a thickness of 50 microns. This band is covered on each side with a layer formed by particles 2 which have been adhered to the band and then flattened. The pellets 2 contact one another, as may be seen from the figures, the surfaces of separation forming heat-transmission resistances.

The band also has a large number of slots 4 which allow an exchange of medium between the ducts of flow in the transverse direction and which also limit the thermal conductivity in the transverse direction of the band. Such slots may be omitted, if desired.

Figure 3:
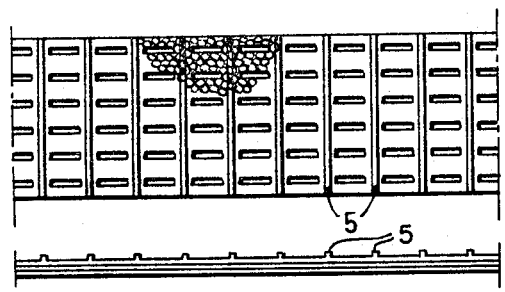
FIGURES 3 and 4 are an elevational view and a sectional view respectively of the band of FIGURES 1 and 2, provided with ribs which serve as spacers.
Figure 4:

FIGURES 3 and 4 show a band similar to that of FIGURE 1, but now provided with a plurality of ribs 5 which serve as spacers as the band is rolled up.

Figure 5:
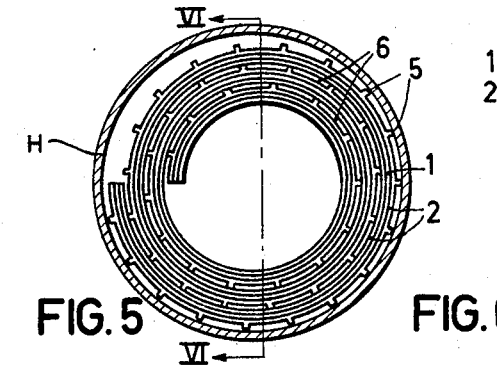
FIGURES 5 and 6 are a plan view and a sectional view, respectively, of the regenerator filling mass.
Figure 6:
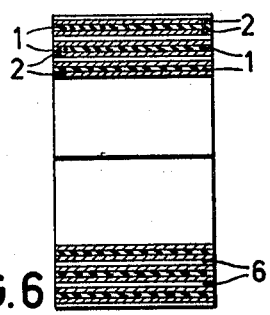

FIGURES 5 and 6 are a plan view and a sectional view, respectively, of a band rolled up to form a filling mass. The band is furthermore shown encased in a cylindrical housing H. In these figures the same reference numerals are used as in the previous figures. After the foregoing, these figures will need no further explanation, but a brief reference is made to the very finely and regularly divided ducts of flow 6 which have arisen between the turns.

Figure 7:
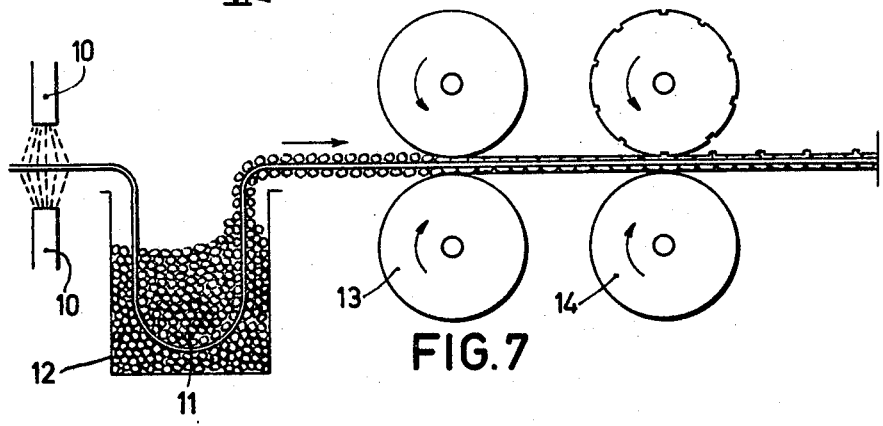
FIGURE 7 shows the order of treatments for a regenerator filler band.

FIGURE 7, at last, shows diagrammatically the sequence of the treatments which a band has to undergo before being suitable for use as a regenerator filling mass. The paper foil 1 is provided on each side with an adhesive layer with the aid of syringes 10. Subsequently the band is lead through a container 12 filled with lead pellets 11, these lead pellets thus adhering to the foil. Subsequently the lead pellets 11 are flattened in a roller 13, whereafter a profile roller 14 provides the band with ribs 5 on one side.

The paper band may have a thickness of 50 microns, the applied layers, after rolling, each have a thickness of 50 microns and the ribs have a height of 25 microns. With these dimensions a regular, finely-divided regenerator is obtained.

What is claimed is:

1. A regenerator comprising a housing, at least one elongated band-shaped filling mass of poor heat conductivity in a rolled-up condition in said housing, a plurality of spacing means on said band-shaped filling mass for spacing the turns of said rolled-up filling mass, and a layer of coating material selected from the group consisting of lead, mercury and cadmium, said layer of material being formed by a plurality of flattened pellets having a high specific heat, said flattened pellets being adhered to both sides of said band.

2. A regenerator as claimed in claim 1 wherein said band of poor heat conducting material is a paper foil.

References Cited

UNITED STATES PATENTS

| | | | |
|---|---|---|---|
| 1,776,162 | 9/1930 | Martinka | 165—10 |
| 1,856,475 | 5/1932 | Frost | 117—160 |
| 2,582,744 | 1/1952 | Brennan | 117—160 X |
| 3,055,768 | 9/1962 | Lassiter | 117—160 X |
| 2,099,572 | 11/1937 | Outman. | |
| 2,168,896 | 8/1939 | Asnes | 117—279 X |
| 2,354,113 | 7/1944 | Gould. | |
| 2,492,788 | 12/1949 | Dennis | 165—4 |
| 2,590,697 | 3/1952 | Grove | 156—279 |
| 2,958,935 | 11/1960 | Bluem | 165—10 |

FOREIGN PATENTS 1,324,372   3/1963   France.

ROBERT A. O'LEARY, *Primary Examiner.*

T. W. STREULE, *Assistant Examiner.*